(12) United States Patent
Brett

(10) Patent No.: US 11,117,523 B2
(45) Date of Patent: Sep. 14, 2021

(54) VIDEO-BASED REAR-VIEW MIRROR SYSTEM FOR VEHICLES INCLUDING MOTORCYCLES

(71) Applicant: Jon Brett, Queenscliff (AU)

(72) Inventor: Jon Brett, Queenscliff (AU)

(73) Assignee: Jon Brett, Queenscliff (AU)

( * ) Notice: Subject to any disclaimer, the term of this patent is extended or adjusted under 35 U.S.C. 154(b) by 0 days.

(21) Appl. No.: 16/858,080

(22) Filed: Apr. 24, 2020

(65) Prior Publication Data

US 2020/0339038 A1    Oct. 29, 2020

(51) Int. Cl.
*B60R 1/12* (2006.01)
*B60R 1/00* (2006.01)
*B60R 1/08* (2006.01)

(52) U.S. Cl.
CPC .............. *B60R 1/12* (2013.01); *B60R 1/006* (2013.01); *B60R 1/08* (2013.01); *B60R 2001/1215* (2013.01); *B60R 2001/1253* (2013.01); *B60R 2300/202* (2013.01); *B60R 2300/8026* (2013.01)

(58) Field of Classification Search
CPC .. B60R 1/12; B60R 1/006; B60R 1/08; B60R 2300/202; B60R 2001/1215; B60R 2300/8026; B60R 2001/1253
See application file for complete search history.

(56) References Cited

U.S. PATENT DOCUMENTS

2019/0283687 A1*  9/2019  Inoue .................. B60R 11/0235

* cited by examiner

*Primary Examiner* — James M Pontius
(74) *Attorney, Agent, or Firm* — TraskBritt

(57) ABSTRACT

An improved video-based rear-view mirror system for vehicles including motorcycles (but also with application to other vehicles including cars, trucks, bicycles, and so on) includes at least one digital display screen configured to be mounted in a side-mirror positioned unit; and at least one camera unit coupled to the digital display screen, such that the digital display screen is configured to display video data captured by the camera unit; wherein the system is configured such that the video data displayed by the at least one display screen is tuned to provide a side-mirror proxy view.

6 Claims, 5 Drawing Sheets

VIDEO-BASED REAR-VIEW MIRROR SYSTEM FOR VEHICLES INCLUDING MOTORCYCLES

PRIORITY CLAIM

This application claims the benefit of the filing date of Australian Patent Application Serial No. 2019901405, filed Apr. 24, 2019, for "Improved Video-Based Rear-View Mirror System for Vehicles including Motorcycles," the disclosure of which is incorporated herein in its entirety by this reference.

TECHNICAL FIELD

The present disclosure relates, in various embodiments, to an improved video-based rear-view mirror system for vehicles including motorcycles (but also with application to other vehicles including cars, trucks, bicycles, and so on). While some embodiments will be described herein with particular reference to that application, it will be appreciated that the present disclosure is not limited to such a field of use, and is applicable in broader contexts.

BACKGROUND

Any discussion of the background art throughout the specification should in no way be considered as an admission that such art is widely known or forms part of common general knowledge in the field.

Side mirrors on motorcycles are often of limited usefulness. There is an inherent compromise between the lateral extension of the mirrors (which can be undesirable from an aesthetic and aerodynamic perspective) and functional field of view (which is adversely affected as lateral extension decreases, for example, with the rider's body blocking a major portion of the mirror's field of view).

As a partial solution to the known problem of mirrors, a known approach is to provide a screen, for example, a LCD screen, on a motorcycle, and use that screen to display a video feed from a centrally-mounted rear-facing camera. Usually, this is by way of a centrally-mounted display screen. The use of such a centrally-mounted screen, particularly as an aftermarket accessory, is seen as unpreferable by many motorcycle enthusiasts. Additionally, positioning of a central mirror often causes a rider to take his/her eyes off the road.

There have been some attempts to mount screens in side mirror units, primarily as a means to overcome aesthetic concerns with the mounting of a central aftermarket screen. Whilst the approach of mounting screens into side mirror units can be more aesthetically pleasing than an aftermarket centrally-mounted screen, functionally it is problematic. In particular, the present inventor has identified a technical problem in that the view provided by a rear-facing camera is quite different from the view a rider would expect from a side mirror. This can lead to confusion, and potentially accidents.

It is an object of the present disclosure to overcome or ameliorate at least one of the disadvantages of the prior art, or to provide a useful alternative.

BRIEF SUMMARY

Example embodiments are described below in the section entitled "claims," and in the section entitled "detailed description."

Reference throughout this specification to "one embodiment," "some embodiments" or "an embodiment" means that a particular feature, structure or characteristic described in connection with the embodiment is included in at least one embodiment of the present disclosure. Thus, appearances of the phrases "in one embodiment," "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

BRIEF DESCRIPTION OF THE DRAWINGS

Embodiments of the present disclosure will now be described, by way of example only, with reference to the accompanying drawings in which.

DETAILED DESCRIPTION

Embodiments include rear-facing camera systems for vehicles, such as motorbikes, cars, trucks, bicycles, and so on. For the purposes of the present disclosure, these will be described by reference to practical application in a motorcycle context, but it should be appreciated that this is for the purposes of example only. However, one should note that the technology is especially useful in a motorcycle context as it overcomes vision deficiencies typically associated with lowprofile side mirrors (as a camera feeding image data to a mirror-unit-mounted screen is positioned rearward of a rider's body).

These systems include at least one digital display screen configured to be mounted in a side-mirror positioned unit; and at least one camera unit coupled to the digital display screen, such that the digital display screen is configured to display video data captured by the camera unit. The system is configured such that the video data displayed by the at least one display screen is tuned to provide a side-mirror proxy view.

The term "side mirror proxy view" is used to describe a view that is intended to replace a side mirror view, for example, in that it is side-specific for the vehicle (as opposed to showing a full rearward view). For example, for a left-side "side mirror proxy view" is, the view is configured to display a region of potential hazard on the left side of a motorcycle, including a left-rear region (and preferably with blind spots avoided, for example, by selecting an adequately wide-angled camera unit).

Whilst in some embodiments there is only a single side mirror unit digital display, preferred embodiments provide dual side mirror unit digital displays. Such embodiments provide a left-side digital display screen configured to be mounted in a left-side side-mirror positioned unit; and a right-side digital display screen configured to be mounted in a right-side side-mirror positioned unit. The system is configured such that: the video data displayed by the left-side display screen is tuned to provide a left-side side-mirror proxy view; and the video data displayed by the right-side display screen is tuned to provide a right-side right-mirror proxy view.

Figure 1:
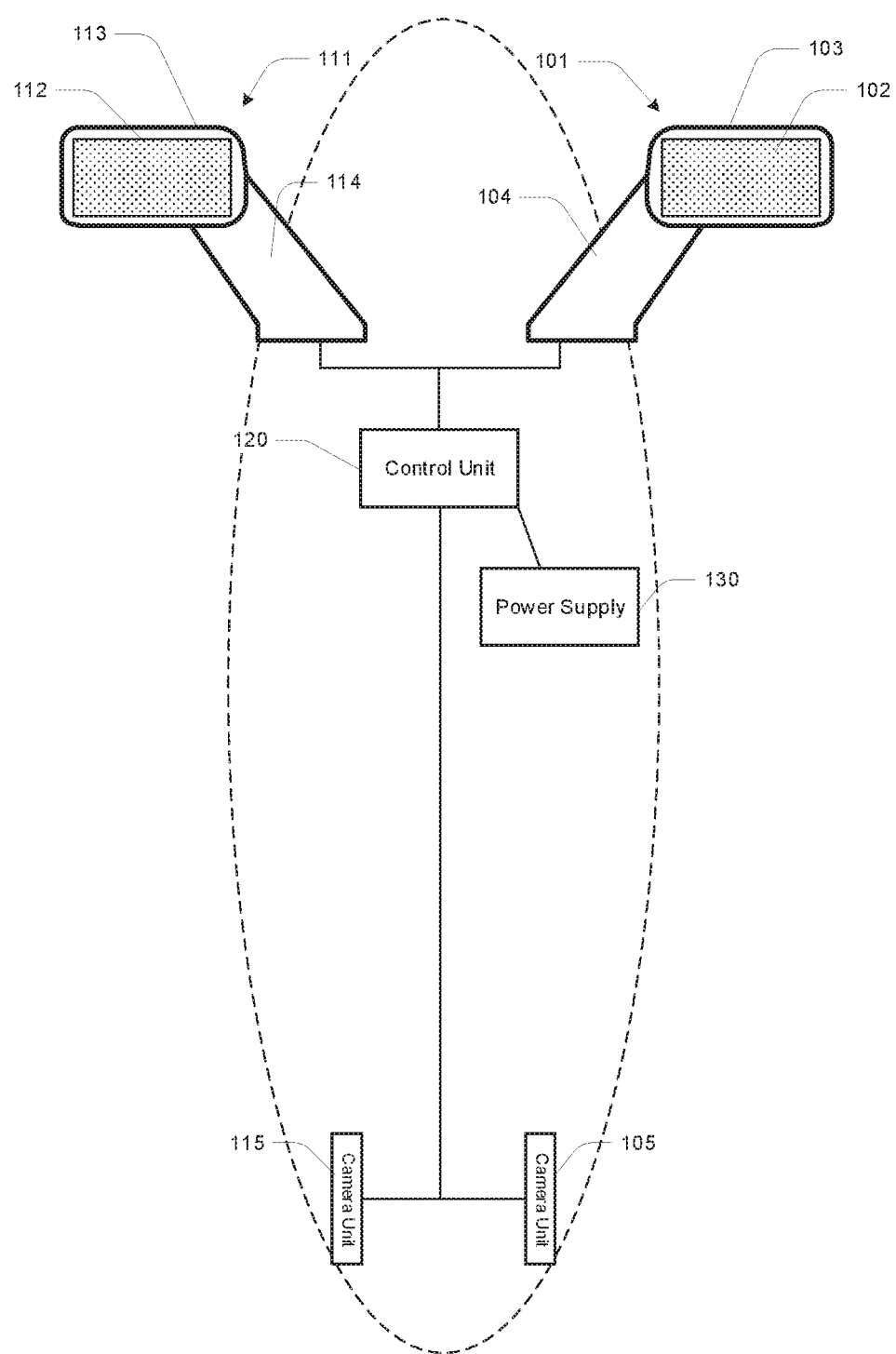
FIG. 1 illustrates a rear-facing camera system according to one embodiment.

FIG. 1 illustrates a system according to one embodiment. The system of FIG. 1 includes: a right-side assembly 101, including digital display screen 102 configured to be mounted in a right-side side-mirror positioned unit 103 (which is mounted to a vehicle via a mounting member 104); and a left-side assembly 111, including digital display screen 112 configured to be mounted in a left-side side-mirror positioned unit 113 (which is mounted to a vehicle via a mounting member 114).

The shape and configuration of units 103 and 113 and members 104 and 114 is illustrative only, and it will be appreciated that the shape and configuration of these components is determined by aesthetic and/or functional choices made based on a vehicle to which the system is applied. In some embodiments those components are inherently provided by the vehicle (i.e., by conventional side mirror units), and the system includes mounting components that enable mounting of display screens 102 and 112 to those side mirror units.

In the embodiment of FIG. 1, screens 102 and 112 are coupled to a common control unit, which is a computing device including two input ports that are, respectively, coupled to a camera unit 105 and a camera unit 115 (the diagrams show components in a non-mounted arrangement, although with a dashed oval generally representing a motorcycle body shape for approximate visualization purposes). In use, the camera units are mounted to a vehicle in positions that, respectively, provide a right-side side-mirror proxy view and a left-side side-mirror proxy view. For example, they are mounted to the body of a motorcycle rearward of a rider seating position (precise mounting location may vary between motorcycles, and cameras are angled based on their positioning and field of view) Digital camera units are preferably used; otherwise an analogue-digital-converter is provided by control unit 120. Control unit 120 includes processing componentry that is configured to pass input signals from the cameras to the respective display screens. In preferred embodiments, as described further below, this includes applying a video transformation algorithm thereby to cause the display screen to display a restricted portion of a video field of view for the respective camera. Control unit 120 is coupled to a power supply 130, which is preferably inherently provided by the vehicle.

Figure 2:
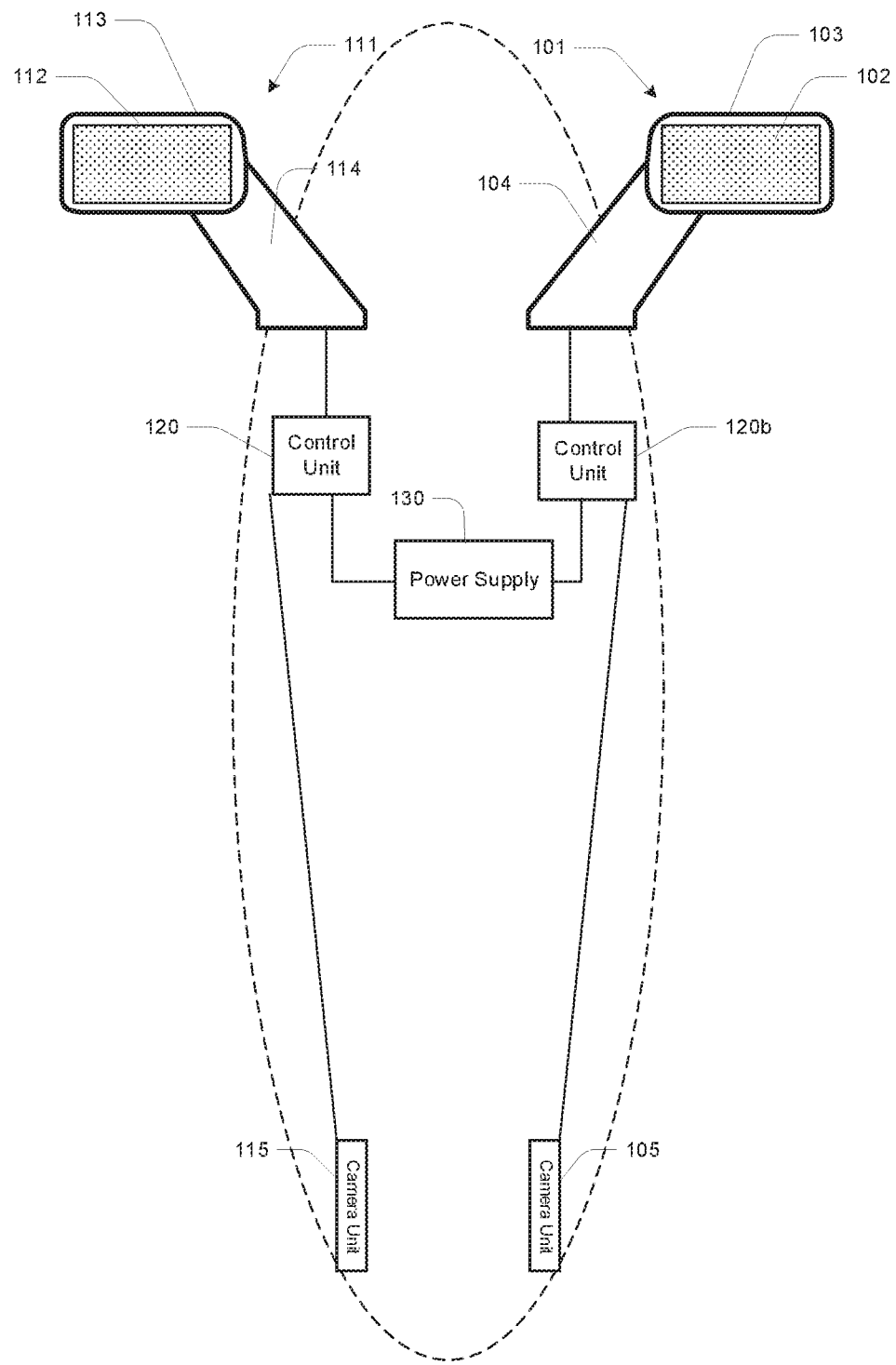
FIG. 2 illustrates a rear-facing camera system according to one embodiment.

The embodiment of FIG. 2 provides a variation in that there are two separate control units 120 and 120b, which, respectively, couple camera unit 115 to digital display screen 112 and camera unit 105 to screen 102. Although the control units are illustrated separately of the screens, a preferred embodiment makes use of screen units, which are housed in a body that also contains the control unit. For example, there are a range of known display devices, which include microprocessors configured to receive and display video data from camera devices, and these are readily configured to execute customized software instructions to provide functionalities described further below (for example, devices that operate on an Android operating system). In the illustrated embodiment a common power supply 130 is again used. This is optionally to provide back-up power for battery power supplies, which are incorporated into screen units.

Figure 3:
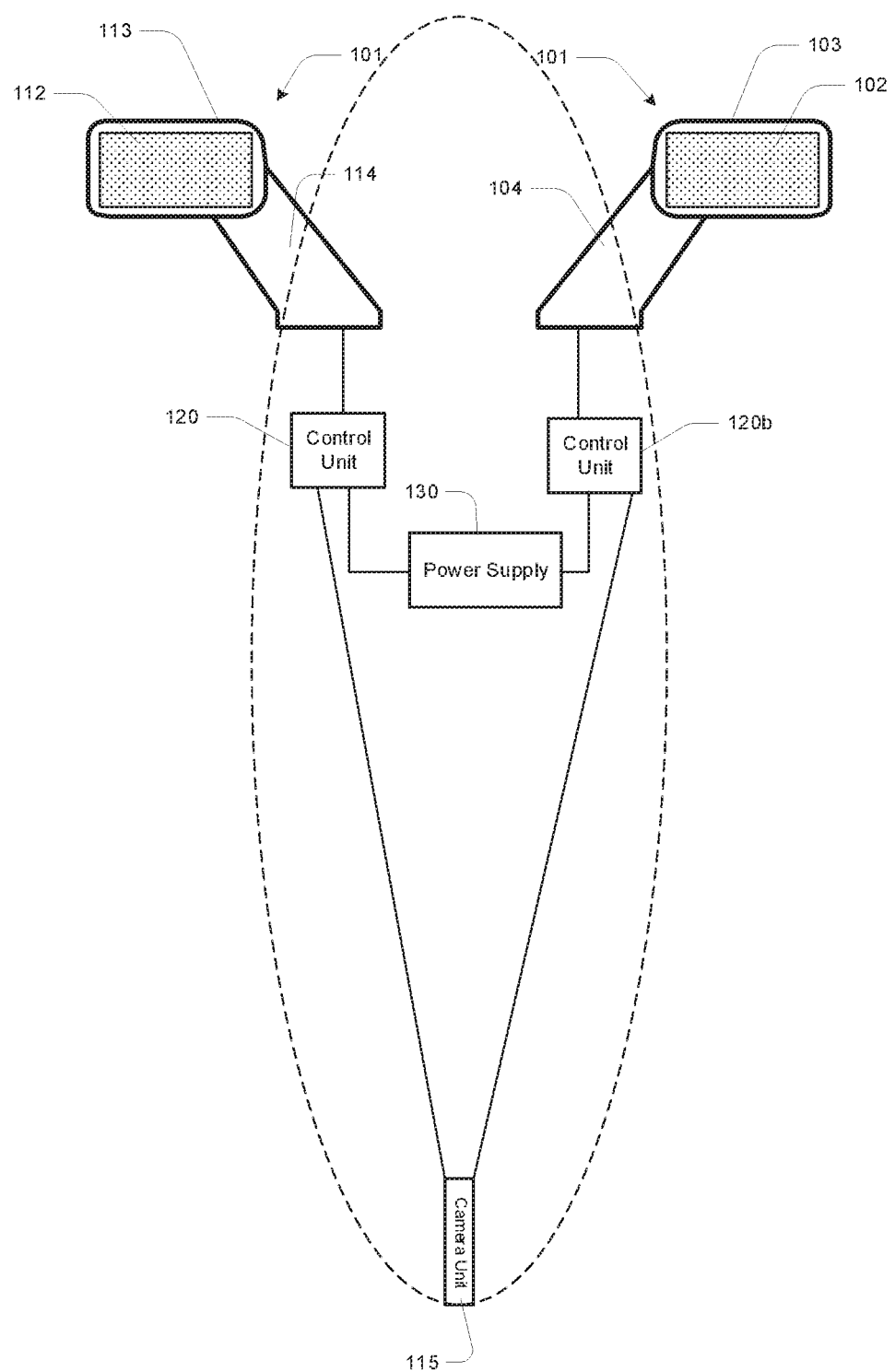
FIG. 3 illustrates a rear-facing camera system according to one embodiment.

The embodiment of FIG. 3 provides a further variation where both screens are coupled to a common camera. Although there is a single common video input, the system is nevertheless configured such that the video data displayed by the left-side display screen is tuned to provide a left-side side-mirror proxy view; and the video data displayed by the right-side display screen is tuned to provide a right-side right-mirror proxy view. This is archived via each screen's control unit applying a video transformation algorithm thereby to display a reduced portion of the camera's field of view. This is discussed further below.

In providing a side-mirror proxy view from a camera positioned rearward of a motorcycle rider, a conventional camera display may be inadequate. For example, a spherical camera lens with field of vision suitable to eliminate blind spots and provide an adequate horizontal spread of visual information will also provide a similarly wide vertical spread, which is: (i) of limited use to the rider; and (ii) has potential to draw away from the regions of actual interest to the rider. Accordingly, some embodiments of the technology disclosed herein make use of a digital video transformation process, which takes a sub-region of the captured video data (for example, a rectangular or non-rectangular spatial sub-region), and transforms that for display on the screen (for example, by applying zoom and other transformations to each video frame thereby to transform the sub-region in each frame to a rectangular shape (or other defined shape) that is displayed in a display area provided by the screen). So, for example, video data captured by a wide-angle camera lens is constrained digitally between capture and display (e.g., by a "live filter" algorithm that provides substantially imperceptible latency in display) thereby to display on the side mirror unit screen a side-mirror proxy view, which displays a sub region of the field of view of the total capture of wide-angle lens that is of pertinent relevance to the rider. This is achieved by video zoom, pan and spatial transformation algorithms.

So as to provide some visual examples, in various embodiments, providing a side-mirror proxy view includes:

Receiving input from the at least one camera unit, wherein the input is defined by a feed of video data having a first field of view. For example, this is represented by the larger rectangles illustrated in FIG. 5A and FIG. 5B.

Processing the input, for example, via one or more video transformation algorithms, thereby to display video data having a second field of view, wherein the second field of view is constrained relative to the first field of view thereby to provide the side-mirror proxy view.

Figure 5A:
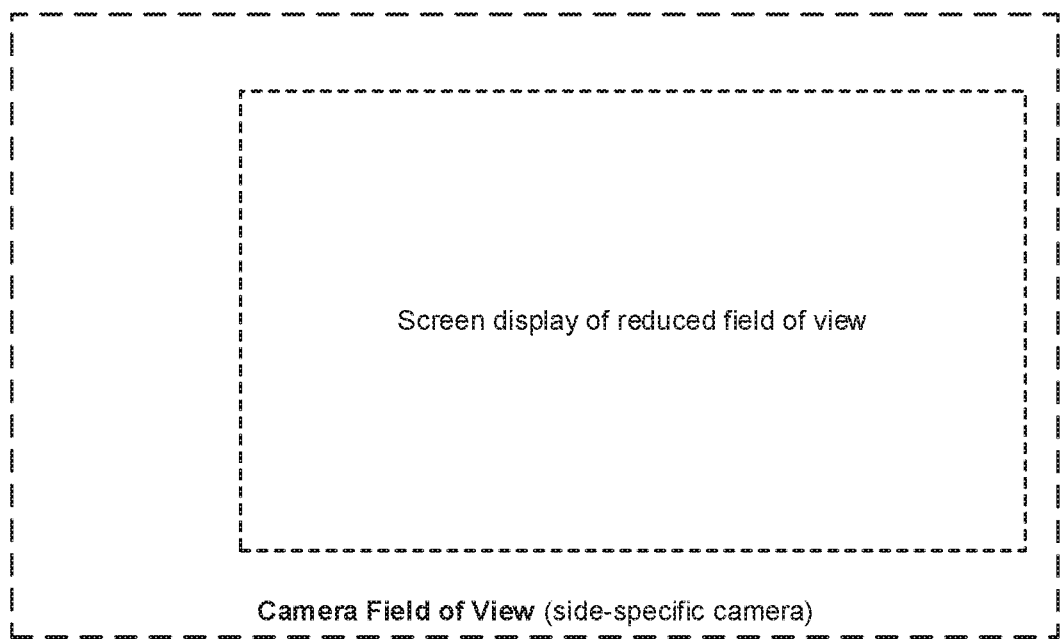
FIG. 5A and FIG. 5B provide illustrative context to video processing techniques according to embodiments.

In the example of FIG. 5A, the portion of video that provides the side-mirror proxy view is represented by the smaller rectangle. In this example, a customized portion of the video data is applied, requiring a video zoom transformation. However, in further embodiments alternate shapes are used to define the second field of view, and that shape is transformed via a video warping algorithm to define a rectangular shape displayable by the display screen. This is useful for reducing warping that may be present in wide angle cameras, and in doing so providing a view that is a better like-for-like proxy for a conventional side mirror.

Figure 5B:
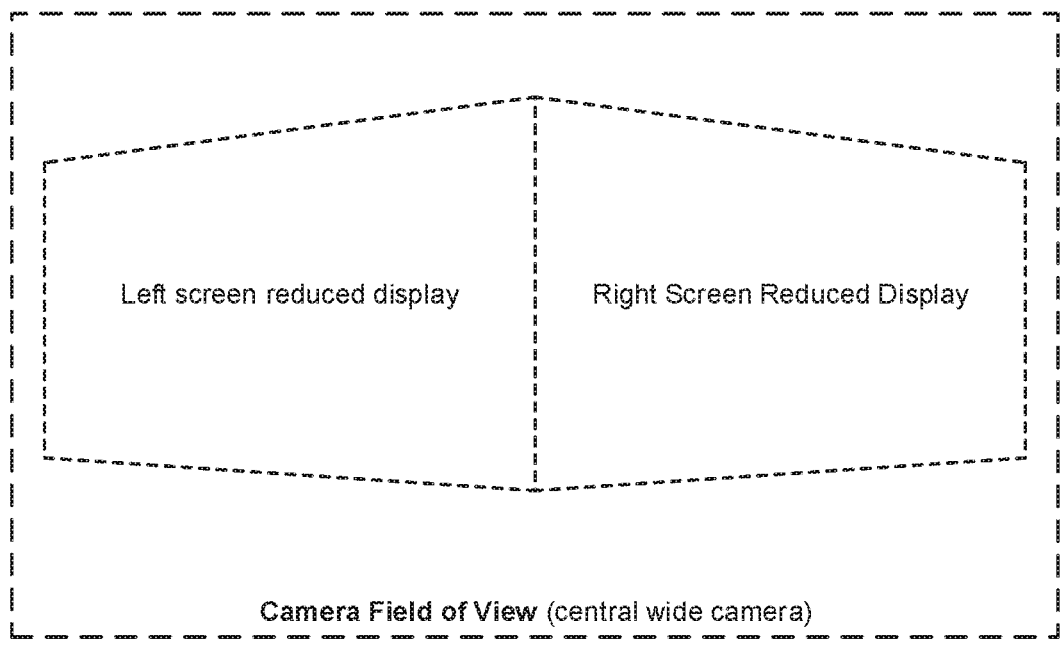

In the example of FIG. 5B there are two reduced displays, represented by irregular quadrangular shapes (which are transformed to standard rectangles for display on screens). This is relevant to the embodiment of FIG. 3, where left and right side mirror proxies are extracted from a single wide-angle camera via video zoom and warping operations. In some cases the left and right reduced display regions overlap.

Figure 4:
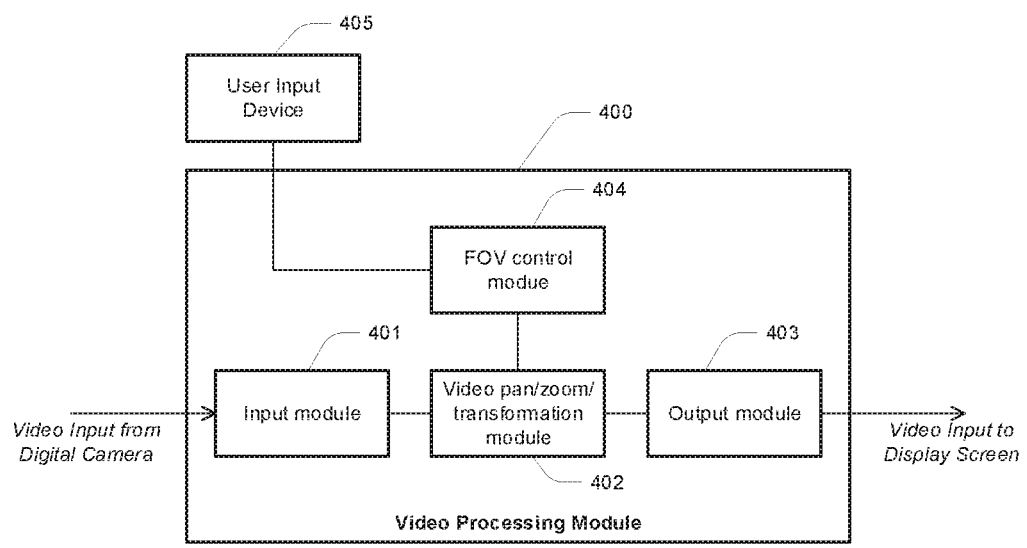
FIG. 4 illustrates a video processing module for a rear-facing camera system according to one embodiment.

FIG. 4 illustrates a video processing module 400, which is configured to provide side-mirror proxy views from a digital camera video input from a conventionally-shaped camera lens. An input module 401 receives the video data, and a video pan/zoom/transformation module 402 (which is optionally defined by software instructions stored in computer memory and executing on a microprocessor) are controlled to provide a transformed video signal (i.e., a stream of video frames each transformed in a predefined matter), which is outputted via an output module 403 and transmitted for display on the display screen.

Module 402 is controlled by a field of view (FOV) control module 404. In some embodiments the FOV control module executes a predefined algorithm, which is selected based on whether the screen is a left side or right side screen, and based on a predefined expected location of a camera. In some embodiments a user input device 405 allows for user customization of the side mirror proxy view, by adjusting zoom level and position. In this regard, the user input device provides controls that allow for control over video zoom and pan characteristics thereby to customize the side mirror proxy view. These controls may be inputted, for example, via: a touchscreen device (for example, using slide to pan and pinch to zoom techniques); or via physical buttons or other toggles (for example, an input control for horizontal pan, an input control for vertical pan, and optionally a further input control for zooming in or out). In both cases, the system provides a user interface that is configured to allow a user to adjust the second field of view thereby to customize the side-mirror proxy view.

It will be appreciated that the above disclosure provides advantages over known technology in terms of allowing screen-based rear-view mirrors to provide views that are, for an operator, a closer "like-for-like" proxy to what would be displayed by a conventional mirror.

Although connections between cameras and screen units shown as wired connections, some embodiments make use of wireless networking protocols (for example, WiFi or BLUETOOTH®).

It should be appreciated that in the above description of exemplary embodiments of the present disclosure, various features of the present disclosure are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of the present disclosure.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the present disclosure.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B, which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present disclosure.

What is claimed is:

1. A rear-facing camera system for a vehicle, the system including:

at least one digital display screen configured to be mounted in a side-mirror positioned unit, wherein the side-mirror positioned unit does not contain a mirror in addition to the digital display screen; and at least one camera unit coupled to the digital display screen, such that the digital display screen is configured to display video data captured by the camera unit, wherein the at least one camera unit is mounted separate from the side-mirror positioned unit;

wherein the system is configured such that the video data displayed by the at least one digital display screen is tuned to provide a side-mirror proxy view, wherein the side-mirror proxy view provides a view corresponding to that which would be provided by a side mirror in the side-mirror positioned unit.

2. The system according to claim 1, including:

a left-side digital display screen configured to be mounted in a left-side side-mirror positioned unit; and a right-side digital display screen configured to be mounted in a right-side side-mirror positioned unit;

wherein the system is configured such that:

the video data displayed by the left-side digital display screen is tuned to provide a left-side side-mirror proxy view; and the video data displayed by the right-side digital display screen is tuned to provide a right-side right-mirror proxy view.

3. The system according to claim 2, wherein the right-side digital display screen is coupled to a first camera unit and the left-side digital display screen is coupled to a second camera unit.

4. The system according to claim 2, wherein providing a side-mirror proxy view includes:

receiving input from the at least one camera unit, wherein the input is defined by a feed of video data having a first field of view; and processing the input thereby to display video data having a second field of view, wherein the second field of view is constrained relative to the first field of view thereby to provide the side-mirror proxy view.

5. The system according to claim 4, including a user interface that is configured to allow a user to adjust the second field of view thereby to customize the side-mirror proxy view.

6. The system according to claim 1, wherein providing a side-mirror proxy view includes:

receiving input from the at least one camera unit, wherein the input is defined by a feed of video data having a first field of view; and processing the input thereby to display video data having a second field of view, wherein the second field of view is constrained relative to the first field of view thereby to provide the side-mirror proxy view.

* * * * *